United States Patent [19]
Mizuta et al.

[11] Patent Number: 5,289,562
[45] Date of Patent: Feb. 22, 1994

[54] PATTERN REPRESENTATION MODEL TRAINING APPARATUS

[75] Inventors: Shinobu Mizuta; Kunio Nakajima, both of Kanagawa, Japan

[73] Assignee: Mitsubishi Denki Kabushiki Kaisha, Tokyo, Japan

[21] Appl. No.: 674,069

[22] Filed: Mar. 21, 1991

[30] Foreign Application Priority Data

Sep. 13, 1990 [JP] Japan .................. 2-243225

[51] Int. Cl.$^5$ .............................................. G10L 9/02
[52] U.S. Cl. ................................................... 395/2
[58] Field of Search ................................. 381/41–48; 395/2; 358/212

[56] References Cited

U.S. PATENT DOCUMENTS 4,783,804  11/1988  Juang et al. ................. 395/2

OTHER PUBLICATIONS

Frederick Jelinek, "Continuous Speech Recognition by Statistical Methods", Proceedings of the IEEE, vol. 64, No. 4, Apr. 1976, pp. 532–556.

L. R. Rabiner et al., "Some Properties of Continuous Hidden Markov Model Representations", AT&T Technical Journal, vol. 64, No. 6, Jul.–Aug. 1985, pp. 1251–1270.

L. R. Bahl et al., "Speech Recognition with Continuous-Parameter Hidden Markov Models,", 1988 IEEE, pp. 40–43.

L. R. Rabiner et al, "Recognition of Isolated Digits Using Hidden Markov Models with Continuous Mixture," AT&T Technical Journal, vol. 64, No. 6, 1985, pp. 1211–1234.

L. R. Bahl et al, "A New Algorithm for the Estimation of Hidden Markov Model Parameters," Proc. IEEE ICASSP 88, pp. 493–496.

Seiichi Nakagawa, "Speech Regcognition by Probability Models," The Institute of Electornics, Information and Communication Engineers (Jul. 1, 1985), pp. 26–28, 33–42, 44–46, 55–61.

*Primary Examiner*—Michael R. Fleming
*Assistant Examiner*—Michelle Doerrler
*Attorney, Agent, or Firm*—Wolf, Greenfield & Sacks

[57] ABSTRACT

Disclosed is an Hidden Markov Model (HMM) training apparatus in which a capacity for discriminating between models is taken into consideration so as to allow a high level of recognition accuracy to be obtained. A probability of a vector sequence appearing from HMMs is computed with respect to an input vector and continuous mixture density HMMs. Through this computation, the nearest different-category HMM, with which the maximum probability is obtained and which belongs to a category different from that of a training vector sequence of a known category, is selected. The respective central vectors of continuous densities constituting the output probability densities of the same-category HMM belonging to the same category as that of the training vector sequence and the nearest different-category HMM are moved on the basis of the vector sequence.

20 Claims, 7 Drawing Sheets $a_{ij}$ : TRANSITION PROBABILITY $\sum_{j} a_{ij} = 1$ $b_{ij}(t)$ : OUTPUT PROBABILITY $\sum_{t} b_{ij}(t) = 1$ $i,j$ : STATE NUMBER $t$ : FEATURE (LABEL/VECTOR)

PATTERN REPRESENTATION MODEL TRAINING APPARATUS

BACKGROUND OF THE INVENTION

1. Field of the Invention

This invention relates to a pattern representation model training apparatus used in learning the parameters of hidden Markov Models (hereinafter referred to as "HMMs") used in a speech recognition apparatus or the like.

2. Description of the Related Art

An HMM is a model representing a feature sequence of a variable sequence length in terms of a probability, and is composed of a plurality of states and transitions therebetween, using, as parameters, inter-state transition probabilities and output probability densities output at the time of transitions. It may be considered that the output probability densities represent the individual features constituting a feature sequence and that the transition probabilities represent feature displacements along the sequence. A basic formulation of an HMM is given in Speech Recognition By Probability Models by Seiichi Nakagawa (Society of Electronic Information Communication), pp. 33-40. FIG. 1 illustrates a concept of an HMM.

Generally, HMMs can be classified into two types: discrete density HMMs and continuous density HMMs. A discrete density HMM represents a feature sequence composed of discrete labels, whereas a continuous density HMM usually represents a feature sequence composed of continuous vectors. An output probability density of a discrete HMM is a probability of each label being output at a corresponding state transition, a value of probability being preset for each label. In an output probability density of a continuous density HMM, a probability of a feature vector is represented in the form of a continuous density such as the Gaussian distribution. In particular, in the case of a continuous mixture density HMM, an output probability density is usually represented by a plurality of Gaussian distributions, each Gaussian distribution being defined by a variance-covariance matrix between a central vector and the parameters and by branch probabilities corresponding to weights on distributions. A probability in which each of the Gaussian distributions constituting a continuous mixture density will be output with respect to a certain vector will be called a "partial probability". A formulation of a continuous mixture density HMM is given in an article "Recognition of Isolated Digits Using Hidden Markov Models with Continuous Mixture Densities" by L. R. Rabiner, B. H. Juang, S. E. Levinson and M. M. Sondhi (AT&T Technical Journal Vol. 64, No. 6, July-August 1985). When representing a vector sequence by means of a discrete density HMM, a vector sequence is transformed into a label sequence by using a vector quantization (hereinafter called VQ). A formulation of VQ is given in Nakagawa, pp. 26-28.

A probability of a certain feature sequence output from an HMM is called an "appearance probability", or simply, a "probability". The appearance probability can be computed from a Trellis algorithm (a forward-path algorithm). This is intended to obtain the sum total of the probabilities of the feature sequences being output with respect to all the paths along which feature paths can be represented. Details on the Trellis algorithm are given in Nakagawa, pp. 40-42. The higher the transition probability and the output probability corresponding to the feature sequence input with respect to each path, the higher the appearance probability obtained.

Another method is to use a Viterbi algorithm, in which a path of the HMM having the highest probability of a feature sequence being output is obtained and the probability thus obtained is used as an appearance probability. Details on the Viterbi algorithm are given in Nakagawa, pp. 44-46. A path obtained here may be regarded as an optimal HMM path with respect to the feature sequence, and called the "Viterbi path".

HMM parameters are generally determined by a maximum likelihood estimation method. In this method, with respect to at least one prepared training feature sequence of a known category, parameters of an HMM of that category are iteratively renewed in such a manner that probabilities of these feature sequences with respect to the HMM become higher. Generally, a Baum-Welch algorithm is used as a maximum likelihood estimation method in connection with a discrete density HMM. A formulation of the Baum-Welch method is given in Nakagawa, pp. 55-61. A method of determining the parameters of a continuous mixture density HMM by a maximum likelihood estimation is described in the article by Rabiner et al.

Pattern recognition using HMMs is performed by the following procedures. First, a parameter-estimated HMM is prepared for each of the categories constituting an object to be recognized. Subsequently, a probability of an input feature sequence of an unknown category appearing with respect to each HMM is obtained. Then, the category to which the HMM of the highest probability belongs is output as the recognition result.

When recognizing a vector sequence by means of HMMs, discrete density HMMs generally require less computation, allowing a recognition apparatus to effect high-speed recognition. However, when using discrete density HMMs, since a vector sequence input is transformed into a label sequence by VQ, a lack in pattern information called a "VQ distortion" occurs, if a vector dispersion is large, resulting in the deterioration of recognition performance. Continuous density HMMs, in contrast, allow a vector sequence to be directly handled, thus making it possible to obtain a high level recognition performance without any influence by a VQ distortion. Of the continuous density HMMs usually employed, continuous mixture density HMMs provide the best representation characteristic and the highest level recognition performance. These facts are experimentally confirmed in the article by Rabiner et al.

Of the HMM training methods for speech recognition using a maximum likelihood estimation, a method by which a continuous mixture density is used as an HMM output probability density is effective, as described in the article by Rabiner et al., in particular, in the case where such data having a large dispersion in acoustic features as obtained from a number of speakers are represented.

FIG. 2 shows the configuration of the HMM training system described in the article by Rabiner et al. In the drawing, the reference numerals 1A, 2A, 3A and 4 indicate an initial continuous mixture density HMM, an acoustic feature vector sequence, a maximum likelihood parameter estimation means and a training result, respectively. In this prior-art example, the unit of the acoustic feature vector sequence and the continuous mixture density HMM is a word.

In this method, however, training is only performed with respect to the unique known acoustic vector input, no relative change being effected with respect to other acoustic vector inputs.

Such parameters as the number of states, the inter-state transition, transition probabilities and output probability densities are preset for the initial continuous mixture density HMMs 1A prepared for a plurality of word categories. The acoustic feature vector sequence 2A belonging to any one of the plurality of word categories can be obtained through sound analysis of speech signals. The maximum likelihood parameter estimation means 3A re-estimates, of the above-mentioned initial continuous mixture density HMMs, the parameters of the same-category HMM belonging to the same word category as the above-mentioned acoustic feature vector sequence, such that an appearance probability of this acoustic feature vector becomes higher. The re-estimated HMM is considered as the initial continuous mixture density HMM. After performing the above-mentioned process a requisite number of times on the same or a different acoustic feature vector sequence, the continuous mixture density HMM obtained is output as the training result 4.

The HMM training by the maximum likelihood estimation method does not take the inter-model discrimination capacity into consideration, so a model obtained has a limited discrimination performance. A learning system has been proposed in which such a problem can be solved in connection with an HMM training method using discrete density HMMs [see, for example, "A New Algorithm for the Estimation of Hidden Markov Model Parameters" by L. R. Bahl, P. F. Brown, P. V. de Sousa and R. L. Mercer (Proc. IEEE ICASSP 88, S11, 2)].

The HMM training system described in the above article may be considered as a system in which recognition estimation is effected on a training feature sequence by using discrete density HMMs prepared for a plurality of categories, the HMMs being renewed in such a manner that recognition errors with respect to this feature sequence are reduced, thereby improving discrimination performance.

FIG. 3 shows the configuration of the training system described in the article by Bahl et al. In the drawing, the reference numerals 1B, 2B, 5, 6, 7, 8, 3B and 4 indicate an initial discrete density HMM, an acoustic feature label sequence, a probability computing means, a probability, a selecting means, a selection result, a label appearance frequency control means and a training result. In this prior-art example, the unit of the acoustic feature label sequence and the discrete density HMM is a word.

Such parameters as the number of states, inter-state transitions and transition probabilities and output probability densities are preset for the initial discrete density HMMs 1B prepared for a plurality of word categories. In this example, the parameters of the initial discrete HMMs are obtained by the maximum likelihood estimation method. The acoustic feature label sequence 2B belonging to any one of the above-mentioned plurality of word categories is obtained from a speech signal by sound analysis and VQ. The probability computing means 5 outputs the probabilities 6 of this acoustic feature label sequence appearing from each of the above-mentioned plurality of initial discrete density HMMs. The selecting means 7 selects, from among the plurality of initial discrete density HMMs, the nearest different-category HMM which belongs to a category different from that of the acoustic feature label sequence used by the probability computing means and which maximizes probability obtained by the probability computing means, and the selecting means then outputs the selection result 8. The label appearance frequency control means 3B controls the label appearance frequency parameters of the same-category HMM selected from the initial discrete density HMMs and belonging to the same word category as the acoustic feature vector sequence and of the nearest different-category HMM selected by the selecting means in such a manner that the probability of the acoustic feature vector sequence is high in the same-category HMM and low in the nearest different-category HMM, thereby re-estimating the HMM parameters. The re-estimated HMMs are used as the initial discrete density HMMs. After performing the above-mentioned process a requisite number of times on the same or a different acoustic feature vector sequence, the discrete density HMM obtained is output as the training result 4.

Next, the operation of the label appearance frequency control means 3B shown in FIG. 3 will be described in detail. FIG. 4 shows a label appearance frequency control algorithm. It will be assumed that the logarithm of the probabilities of the acoustic feature label sequence appearing from the same-category HMM and from the nearest different-category HMM are PA and PB, respectively. When PA is sufficiently larger than PB, that is, $PA - PB > \delta$ and $\delta > 0$, no recognition error is considered to occur with respect to the acoustic feature label sequence, and any HMM is not renewed. When PA is smaller than PB, that is $PA - PB \leq 0$, a recognition error is considered to occur and the following procedure is performed. Assuming that $L(f)$ indicates the label of the f-th frame of the acoustic feature label sequence, and $SA(f)$ and $SB(f)$ indicate the states which are determined by Viterbi paths obtained at the time of probability computation (such a relationship between the feature sequence and the HMM state as will maximize the probability), and which correspond to $L(f)$ with respect to the same-category HMM and the nearest different-category HMM, respectively, the appearance frequencies $c(SA(f), L(f))$ and $c(SB(f), L(f))$ of the label $L(f)$ in the respective states are renewed as follows:

$$c(SA(f), L(f)) = c(SA(f), L(f)) + \beta \quad (1)$$

$$c(SB(f), L(f)) = c(SB(f), L(f)) - \beta$$
$$(\beta > 0)$$

However, when $c(SB(f), L(f)) < 0$, $$c(SB(f), L(f)) = \epsilon \quad (2)$$

($\epsilon$ is a sufficiently small value). Further, when PA is larger than PB but the difference between them is small, that is, $0 < PA - PB \leq \delta$, the above-mentioned label appearance frequencies are renewed as follows by using a value $\gamma$ ($0 \leq \gamma \leq \beta$):

$$c(SA(f), L(f)) = c(SA(f), L(f)) + \gamma \quad (3)$$

$$c(SB(f), L(f)) = c(SB(f), L(f)) - \gamma \quad (4)$$

where $\gamma = \beta(1 - (PA - PB)/\delta)$

However, when $c(SB(f), L(f)) < 0$, $$c(SB(f), L(f)) = \epsilon \quad (5)$$

($\epsilon$ is a sufficiently small value).

The concept of the label appearance frequency renewal will be explained with reference to FIG. 5. As shown in the drawing, the label output probabilities in the respective HMM states may be considered as the respective label appearance frequencies in these states normalized by the total label appearances. As can be seen from FIG. 5, the above-mentioned appearance frequency renewal causes the probability with respect to the same-category HMM to become higher, and the probability with respect to the nearest different-category HMM to become lower. Through the label appearance frequency control, the output probability of L(f) in the state SA(f) becomes higher and the output probability of L(f) in the state SB(f) becomes lower, so that the HMM is renewed such that PA increases and PB decreases. As a result, the recognition error with respect to the acoustic feature label sequence is reduced. It may be concluded from this that a capacity for discriminating between HMMs can be improved.

The HMM training device shown in the article by Rabiner et al. is intended for continuous mixture density HMMs and can be expected to provide a high level of discrimination performance. Since, however, it does not take into consideration a capacity for discriminating between models, such a device has a limited HMM discrimination performance.

The HMM training device shown in the article by Bahl et al. adopts a training system aiming at an improvement in the capacity for discriminating between models, and can provide HMMs having a higher level of discrimination capacity as compared to the case where the maximum likelihood estimation method is used. Since, however, such an HMM training device is intended for discrete density HMMs, a deterioration in performance due to VQ distortion is inevitable.

The training method adopted in the article by Bahl et al. for the purpose of enhancing the capacity for discriminating between models controls the label appearance frequency, and cannot be applied to the training system of Rabiner et al. where a vector sequence is treated directly.

SUMMARY OF THE INVENTION

The present invention has been made with a view to eliminating the above problems. It is accordingly an object of the invention to provide an HMM training apparatus which uses continuous mixture density HMMs providing a high discrimination performance and which provides models having a high level of recognition accuracy, taking into consideration a capacity for discriminating between models.

In accordance with the present invention, there is provided a training device comprising:

a computing means for making a comparison between an input vector sequence and continuous density HMMs serving as a reference to compute probabilities, a plurality of categories of said HMMs being prepared;

a selection means for selecting, with respect to at least one training vector sequence of a known category, the nearest different-category HMM which belongs to a category different from that of said training vector sequence and which maximizes a probability obtained by said computing means;

a vector control means for moving, on the basis of said training vector sequence, respective central vectors of continuous densities constituting output probability densities of the same-category HMM belonging to the same category as that of said training vector sequence and of said nearest different-category HMM.

Said vector control means according to the present invention may a. correlate the vectors constituting said training vector sequence with a plurality of output probability densities constituting the HMMs;

b. select, from among continuous densities constituting said correlated output probability densities represented by continuous densities, a continuous density which maximizes a partial probability with respect to said respective vector; and c. move, with respect to said respective vectors constituting said training vector sequence, a central vector of said selected continuous density in the direction of said respective vectors when said selected continuous density belongs to the same-category HMM, and in the opposite direction when said selected continuous density belongs to the nearest different-category HMM.

In accordance with the present invention, a pattern representation model training apparatus can be provided in which a capacity for discriminating between models is taken into consideration with respect to continuous mixture density HMMs having a high level of recognition performance, making it possible to obtain a model having a higher level of discrimination performance.

Other objects and advantages of the invention as well as those mentioned above will become more apparent by considering the following detailed description made with reference to the accompanying drawings.

DETAILED DESCRIPTION OF THE PREFERRED EMBODIMENT

In a training system according to the present invention, recognition of a feature sequence for training is estimated by using continuous mixture density HMMs prepared for a plurality of categories, the HMMs being renewed such that recognition errors with respect to the feature sequence are reduced, thereby attaining an improvement in a capacity for discriminating between models.

Figure 1:
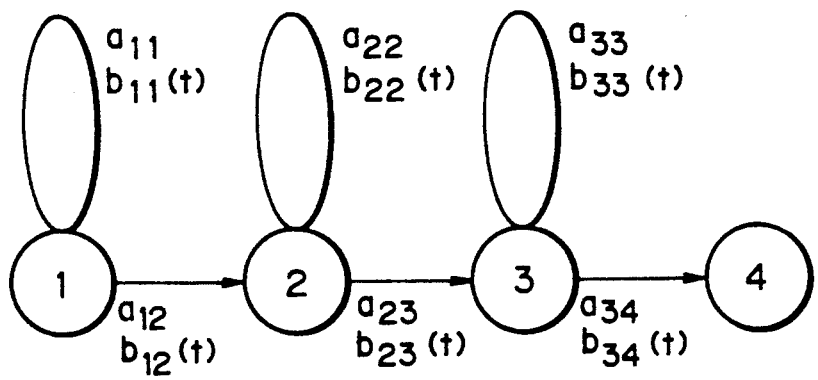
FIG. 1 is a drawing showing the concept of an HMM.
Figure 2:
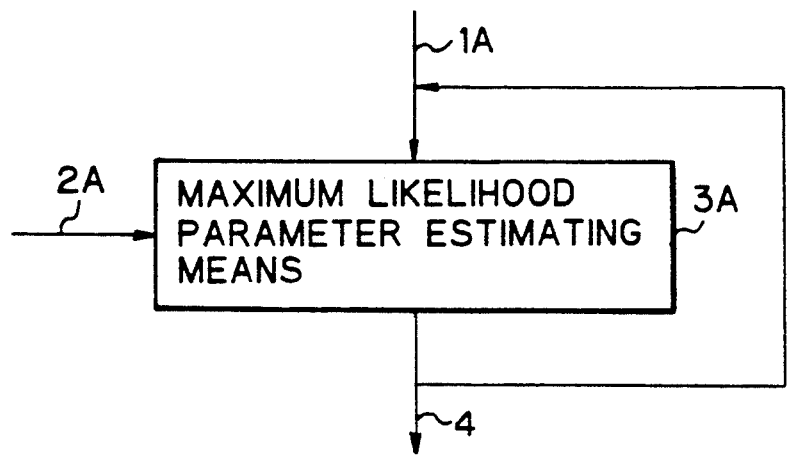
FIG. 2 is a block diagram showing a prior-art HMM training apparatus for speech recognition.
Figure 3:
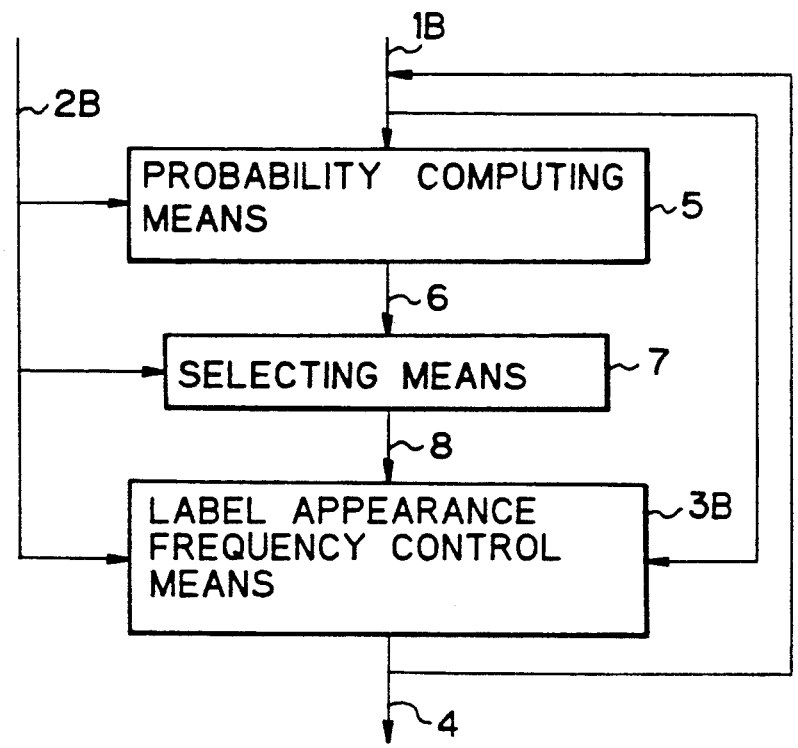
FIG. 3 is a block diagram showing another prior-art HMM training apparatus for speech recognition.
Figure 4:
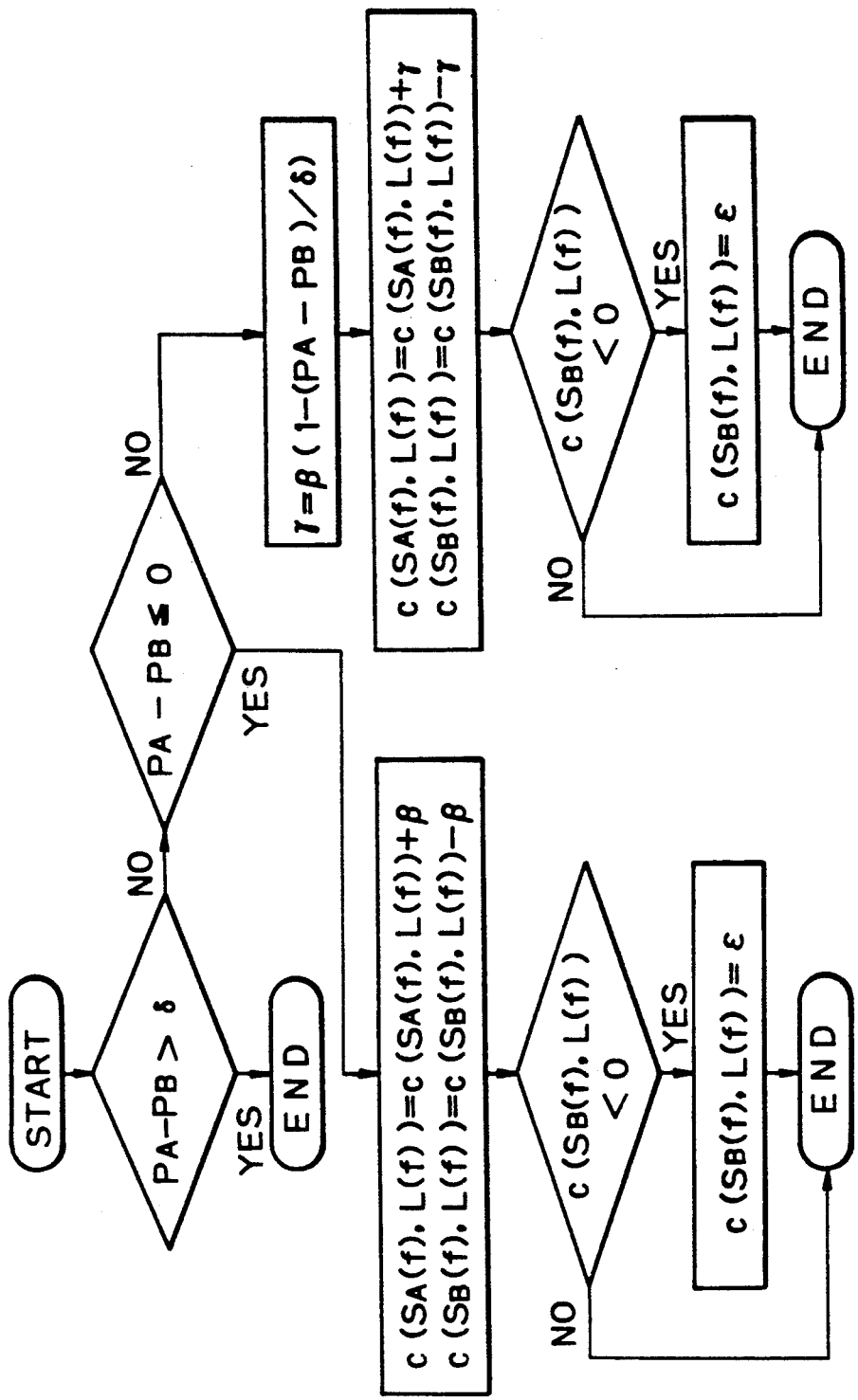
FIG. 4 is a flowchart showing a control algorithm in a VQ label appearance frequency control means shown in FIG. 3.
Figure 5:
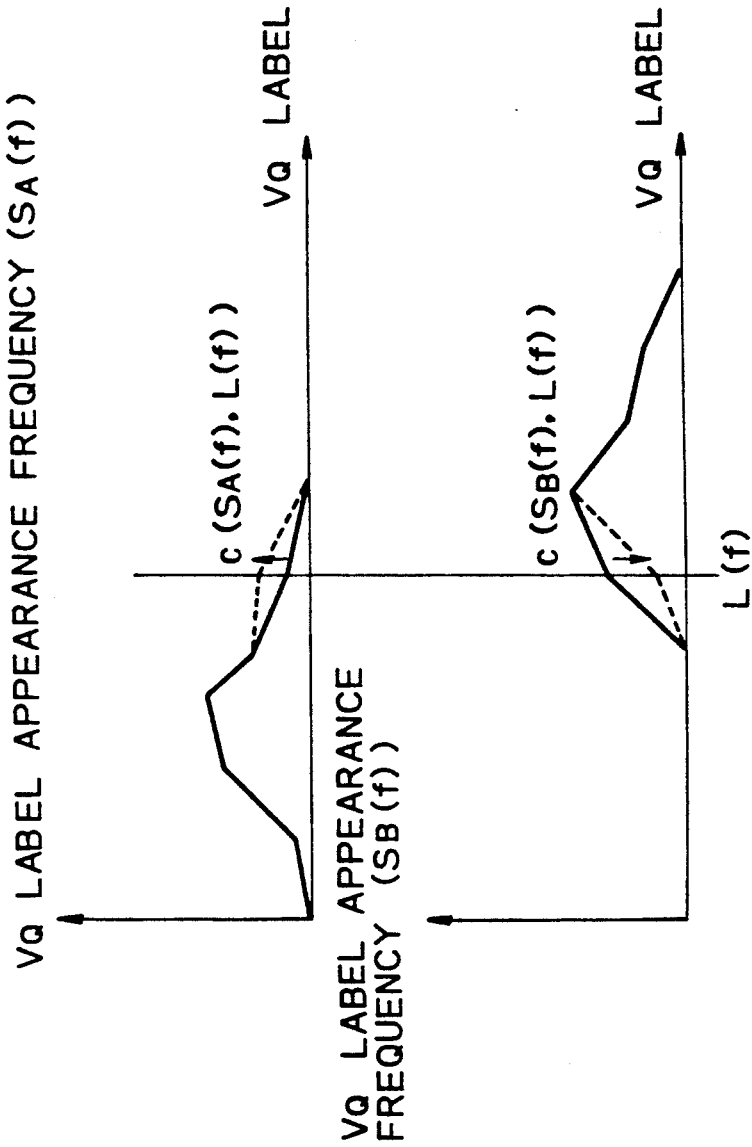
FIG. 5 is a diagram for illustrating a control concept in the VQ label appearance frequency control means.
Figure 6:
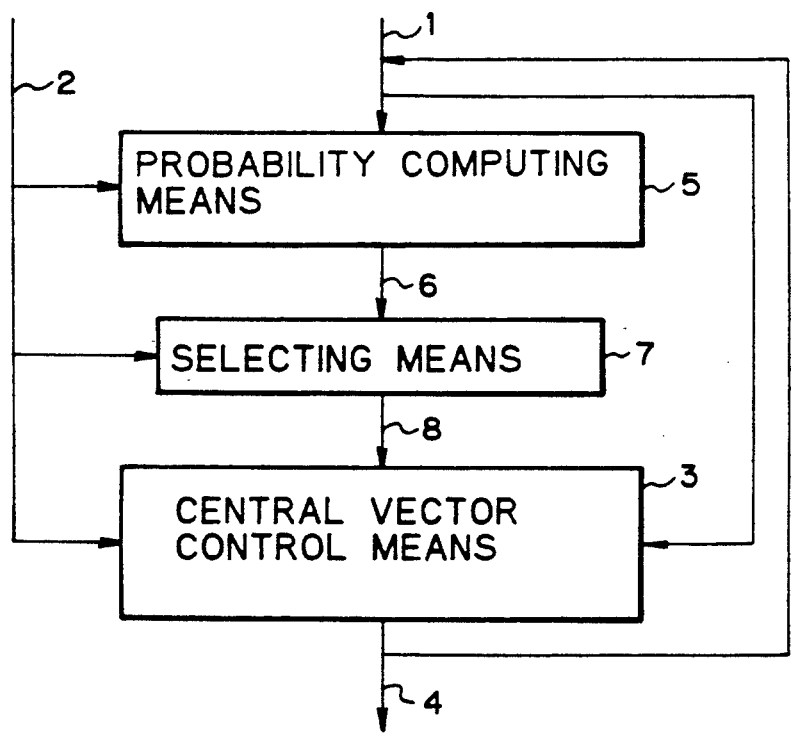
FIG. 6 is a block diagram showing an embodiment of an HMM training apparatus for speech recognition in accordance with the invention.

FIG. 6 is a block diagram showing an embodiment of an HMM training apparatus for speech recognition according to the present invention.

In the drawing, the reference numerals 1, 2, 5, 6, 7, 8, 3 and 4 respectively indicate an initial continuous mixture density HMM, acoustic feature vector sequence, a probability computing means, an appearance probability, a selecting means, a selection result, a central-vector control means and a training result. In this embodiment, the unit of the acoustic feature vector sequence and the continuous mixture density HMMs is a word.

Such parameters as the number of states, inter-state transitions, transition probabilities and output probability densities are preset for the initial continuous mixture density HMMs 1 prepared for a plurality of word categories. In this example, the parameters of the initial continuous mixture HMMs have been obtained by the maximum likelihood estimation method. The acoustic feature vector sequence 2 belonging to any one of the plurality of word categories is obtained from an audio signal through speech analysis. The probability computing means 5 outputs the probability 6 of the acoustic feature vector sequence appearing from each of the plurality of initial continuous mixture density HMMs. The selecting means 7 selects, from among the plurality of initial continuous mixture density HMMs, the nearest different-category HMM which belongs to a category different from that of the acoustic feature vector sequence used by the probability computing means and which maximizes the probability obtained by the probability computing means, and outputs the selection result 8. The central-vector control means 3 moves the central vectors of continuous output probability densities of the same-category HMM selected from the initial continuous mixture density HMMs and belonging to the same word category as the acoustic feature vector sequence and the nearest different-category HMM selected by the selecting means such that the probability of the acoustic feature vector sequence is high in the same-category HMM and low in the nearest different-category HMM, thereby re-estimating the HMM parameters. The re-estimated HMMs are considered as the initial continuous mixture density HMMs. After performing the above-mentioned process a requisite number of times on the same or a different acoustic feature vector sequence, the continuous mixture density HMM obtained is output as the training result 4.

Next, an operation of the central-vector control means in this embodiment will be described in detail.

Figure 7:
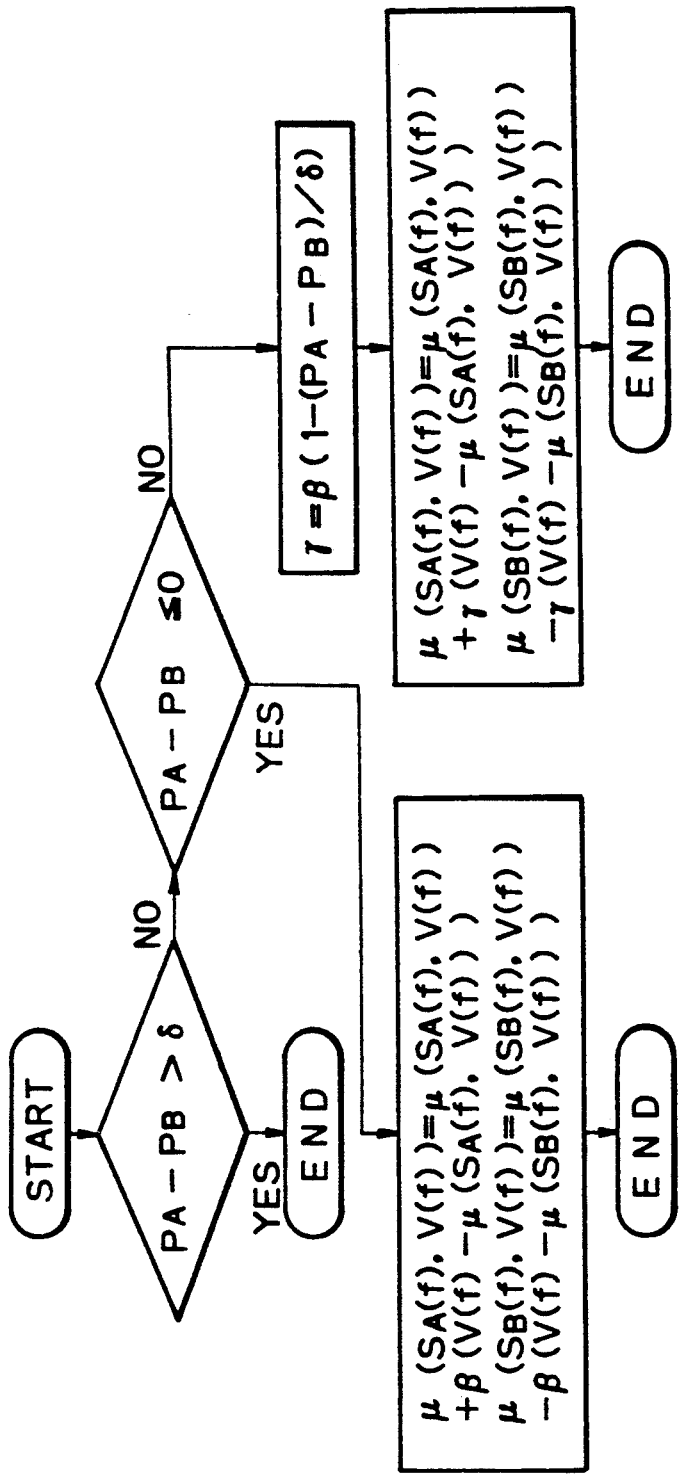
FIG. 7 is a flowchart showing a control algorithm in a central-vector control means of the apparatus shown in FIG. 6.
Figure 8:
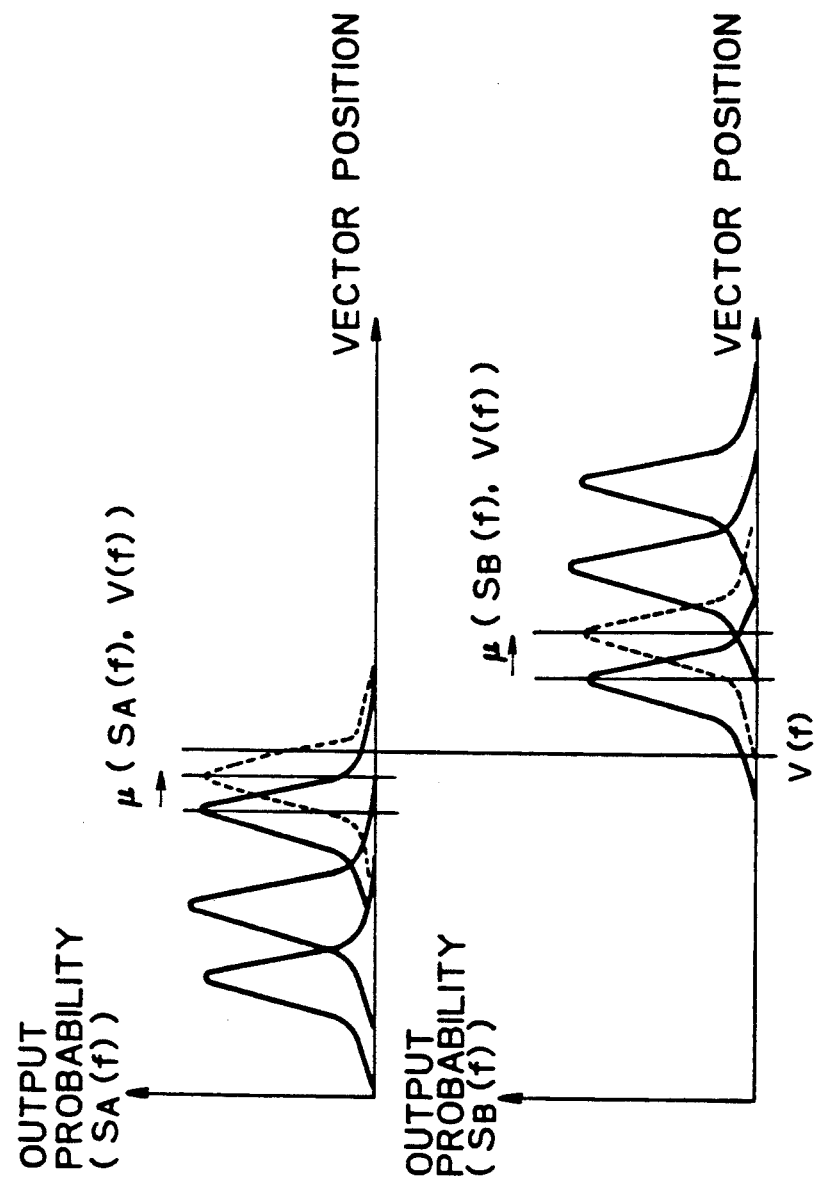
FIG. 8 is a diagram for illustrating a control concept in the central-vector control means.

FIG. 7 shows a central-vector control algorithm. PA and PB respectively indicate the logarithm of the probabilities of the acoustic feature vector sequence appearing from the same-category HMM and from the nearest different-category HMM. When PA is sufficiently larger than PB, that is, $PA-PB > \delta$ and $\delta > 0$, no recognition error is considered to have been made with respect to the acoustic feature vector sequence, and the HMMs are not renewed. When PA is smaller than PB, that is, $PA-PB \leq 0$, a recognition error is considered to have been made, and the following procedure is performed. Assume that V(f) indicates the feature vector of the f-th frame of the acoustic feature vector sequence, and that SA(f) and SB(f) indicate the states which are determined by the Viterbi paths obtained at the time of the probability computation and which correspond to V(f) with respect to the same-category HMM and the nearest different-category HMM, respectively. From among the continuous mixture densities having a density number M and representing the output probabilities in the respective states, densities which maximize a partial probability with respect to V(f) are selected. The central vectors of the selected densities are indicated as $\mu(SA(f), V(f))$ and $\mu(SB(f), V(f))$, respectively. These central vectors are renewed as follows:

$$\mu(SA(f), V(f)) = \mu(SA(f), V(f)) + \beta(V(f) - \mu(SA(f), V(f))) \quad (6)$$

$$\mu(SB(f), V(f)) = \mu(SB(f), V(f)) - \beta(V(f) - \mu(SB(f), V(f)))$$

$$(\beta > 0)$$

When PA is larger than PB but the difference between them is small, that is, $0 < PA - PB \leq \delta$, the central vectors are renewed as follows by using a value $\gamma$ ($0 \leq \gamma \leq \beta$):

$$\mu(SA(f), V(f)) = \mu(SA(f), V(f)) + \gamma(V(f) - \mu(SA(f), V(f))) \quad (7)$$

$$\mu(SB(f), V(f)) = \mu(SB(f), V(f)) - \gamma(V(f) - \mu(SB(f), V(f)))$$

$\gamma$ is determined from equation (4). In this embodiment, it can be assumed that $\delta = 3.0$ and $\beta = 0.075$.

Through this operation, $\mu(SA(f), V(f))$ approaches V(f) and $\mu(SB(f), V(f))$ moves away from V(f). Accordingly, the output probability of V(f) in the state SA(f) becomes higher and the output probability of V(f) in the state SA(f) becomes lower, and the model is renewed such that PA increases, PB decreasing. As a result, the recognition error occurring with respect to the acoustic feature vector sequence is reduced. It may be concluded from this that an improvement is attained in a capacity for discriminating between HMMs.

In this embodiment, other values may be adopted for $\delta$ and $\beta$. While in this embodiment the central-vector is controlled to increase PA and to decrease PB, it is also possible to control either of them. Further, the following central-vector controlling equations may be used:

$$\mu(SA(f), V(f)) = \mu(SA(f), V(f)) + \beta V(f)$$

$$\mu(SB(f), V(f)) = \mu(SB(f), V(f)) - \beta V(f) \quad (8)$$

While in this embodiment speech constitutes an object of training, it may be applied to other objects such as images. Thus, conditions of this sort do not restrict the scope of the invention.

What is claimed is:

1. An apparatus for training a pattern representation model for classifying and discriminating an input acoustic feature vector sequence, comprised of at least one vector, into one of a plurality of categories, the model including a hidden Markov model for each category having output probability densities defined by a mixture of continuous densities and having a central vector representing the means of the continuous densities, the apparatus comprising:

means for comparing a training acoustic feature vector sequence of a known category to the hidden Markov models to compute a probability for each of the categories;

means for selecting the hidden Markov model, of a category other than the known category, which provided the maximum probability in response to the training acoustic feature vector sequence; and vector control means for moving, on the basis of the training acoustic feature vector sequence, the central vectors of the selected hidden Markov model and of the hidden Markov model of the known category.

2. The apparatus of claim 1, wherein the vector control means comprises:

means for correlating the vectors constituting the training acoustic feature vector sequence with the plurality of output probability densities of the plurality of hidden Markov models;

means for selecting, from among the continuous densities of the correlated output probability densities, the continuous density which maximizes a partial probability with respect to the vectors; and means for moving, on the basis of the vectors constituting the training acoustic feature vector sequence, the central vector of the selected continuous density in the direction of the vectors when the selected continuous density belongs to the known category and in the opposite direction when the selected continuous density belongs to a category other than the known category.

3. The apparatus of claim 2, wherein the means for correlating includes means for applying a Viterbi algorithm.

4. The apparatus of claim 1, wherein said means for comparing includes means for applying a Viterbi algorithm.

5. The apparatus of claim 1, further comprising means for repeatedly applying the training acoustic feature vector sequence so as to train parameters of the hidden Markov models sequentially.

6. The apparatus of claim 1, further comprising speech analysis means for analyzing speech to transform the speech into a time sequence of acoustic feature vectors, said speech analysis means being used to provide a training acoustic feature vector sequence to train the hidden Markov models of the pattern recognition model to be used as a speech recognition apparatus.

7. An apparatus for training a pattern representation model for classifying a vector sequence of physical data into one of a plurality of categories, the model including a hidden Markov model for each category having output probability densities defined by a mixture of continuous densities and having a central vector representing the means of the continuous densities, the apparatus comprising:

means for comparing a training vector sequence of a known category to continuous mixture density hidden Markov models to compute a probability for each of the categories;

means operative in response to the means for comparing for selecting the hidden Markov model, of a category other than the known category, which provided the maximum probability in response to the training vector sequence; and means responsive to a selection by the means for selecting for moving, on the basis of the training vector sequence, the central vectors of the selected hidden Markov model and of the hidden Markov model of the known category.

8. The apparatus of claim 7, wherein the vector sequence of physical data is an acoustic feature vector sequence obtained through analysis of an audio signal.

9. The apparatus of claim 7, wherein the vector sequence of physical data is a vector sequence of image data.

10. A method for training a continuous density hidden Markov model representation of patterns of physical data, comprising the steps of:

preparing a plurality of hidden Markov models, each hidden Markov model corresponding to a category and having a central vector indicative of the means of the continuous mixture density;

computing a probability corresponding to an input pattern of a known category for each prepared hidden Markov model;

selecting the category of the prepared hidden Markov model which has the maximum probability corresponding to the input pattern;

moving, when the selected category is not the known category, the central vectors of the hidden Markov models of the known category and of the selected category prepared hidden Markov model.

11. The method of claim 10, wherein the vector sequence of physical data is an acoustic feature vector sequence obtained through analysis of an audio signal.

12. The method of claim 10, wherein the vector sequence of physical data is a vector sequence of image data.

13. An apparatus for training a pattern representation model comprised of a plurality of hidden Markov models with continuous mixture densities, each hidden Markov model representing a separate category of pattern of physical data and having a central vector indicative of the means of the continuous mixture density, the apparatus comprising:

first means for comparing a training pattern of a known category to the plurality of hidden Markov models to obtain a probability for each hidden Markov model;

means for selecting each hidden Markov model, of a category other than the known category, which provided in response to the training pattern a probability within a predetermined distance of the probability provided by the hidden Markov model of the known category;

second means, operative in response to a selection by the means for selecting, for comparing the maximum probability provided by the selected hidden Markov model to the probability provided by the hidden Markov model of the known category; and means, operative in response to the comparison by the second means for comparing, for moving the central vectors of the hidden Markov model of the known category and of the selected hidden Markov model.

14. An method for training a pattern representation model for classifying and discriminating an acoustic feature vector sequence into one of a plurality of categories, the model including a hidden Markov model for each category having output probability densities defined by a mixture of continuous densities and having a central vector representing the means of the continuous densities, the method comprising the steps of:

comparing a training acoustic feature vector sequence of a known category to the continuous mixture density hidden Markov models of compute a probability for each of the categories;

selecting the hidden Markov model, of a category other than the known category, which provided the maximum probability in response to the training acoustic feature vector sequence; and moving, on the basis of the training acoustic feature vector sequence, the central vectors of the selected hidden Markov model and of the hidden Markov model of the known category.

15. The method of claim 14, wherein the step of moving comprises the steps of:

correlating the vectors constituting said training acoustic feature vector sequence with the plurality of output probability densities of the plurality of hidden Markov models;

selecting, from among the continuous densities of the correlated output probability densities, the continuous density which maximizes a partial probability with respect to the vectors; and moving, on the basis of the vectors constituting the training input acoustic feature vector sequence, the central vector of the selected continuous density in the direction of the vectors when the selected continuous density belongs to the known category and in the opposite direction when the selected continuous density belongs to a category other than the known category.

16. The method of claim 15, wherein the step of correlating includes the step of applying a Viterbi algorithm.

17. The method of claim 14, wherein the step of comparing includes the step of applying a Viterbi algorithm.

18. The method of claim 14, further comprising the step of repeatedly applying the training acoustic feature vector sequence so as to train parameters of the hidden Markov models sequentially.

19. The method of claim 14, further comprising the step of analyzing speech to transform the speech into a time sequence of acoustic feature vectors, the step of analyzing providing a training acoustic feature vector sequence to train the hidden Markov models of the pattern recognition model to be used as a speech recognition apparatus.

20. A method for training a pattern representation model comprised of a plurality of hidden Markov models with continuous mixture densities, each hidden Markov model representing a separate category of pattern of physical data and having a central vector indicative of the means of the continuous mixture density, the method comprising:

(a) comparing a training pattern of a known category to the plurality of hidden Markov models to obtain a probability for each hidden Markov model;

(b) selecting each hidden Markov model, of a category other than the known category, which provided in response to the training pattern a probability within a predetermined distance of the probability provided by the hidden Markov model of the known category;

(c) comparing the maximum probability provided by the selected hidden Markov model to the probability provided by the hidden Markov model of the known category; and (d) moving the central vectors of the hidden Markov model of the known category and of the selected hidden Markov model on the basis of the step (c) of comparing.

* * * * *